United States Patent
Raghavan et al.

(10) Patent No.: US 6,976,932 B2
(45) Date of Patent: Dec. 20, 2005

(54) MULTI-SPEED PLANETARY TRANSMISSION MECHANISMS WITH A STATIONARY PLANETARY MEMBER AND TWO BRAKES

(75) Inventors: Madhusudan Raghavan, West Bloomfield, MI (US); Norman K. Bucknor, Troy, MI (US); Patrick B. Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 41 days.

(21) Appl. No.: 10/737,510

(22) Filed: Dec. 16, 2003

(65) Prior Publication Data

US 2005/0130791 A1 Jun. 16, 2005

(51) Int. Cl.$^7$ ............................................. F16H 3/44
(52) U.S. Cl. ................ 475/296; 475/276; 475/277; 475/278; 475/280; 475/284; 475/288
(58) Field of Search ....................... 475/276, 277, 475/278, 280, 284, 288, 296

(56) References Cited

U.S. PATENT DOCUMENTS

| | | | | |
|---|---|---|---|---|
| 3,971,268 A | * | 7/1976 | Murakami et al. | 475/276 |
| 4,070,927 A | | 1/1978 | Polak | 475/286 |
| 4,709,594 A | | 12/1987 | Maeda | 475/280 |
| 5,106,352 A | | 4/1992 | Lepelletier | 475/280 |
| 5,599,251 A | | 2/1997 | Beim et al. | 475/275 |
| 6,053,839 A | | 4/2000 | Baldwin et al. | 475/281 |
| 6,071,208 A | | 6/2000 | Koivunen | 475/275 |
| 6,083,135 A | | 7/2000 | Baldwin et al. | 475/276 |
| 6,176,802 B1 | * | 1/2001 | Kasuya et al. | 475/269 |
| 6,375,592 B1 | | 4/2002 | Takahashi et al. | 475/262 |
| 6,422,969 B1 | | 7/2002 | Ragavan | 475/276 |
| 6,425,841 B1 | | 7/2002 | Haka | 475/275 |
| 6,471,615 B1 | | 10/2002 | Naraki et al. | 475/262 |
| 6,558,287 B2 | | 5/2003 | Hayabuchi et al. | 475/271 |
| 6,623,397 B1 | | 9/2003 | Ragavan et al. | 475/276 |
| 6,672,988 B1 | * | 1/2004 | Raghavan et al. | 475/276 |
| 6,709,359 B2 | * | 3/2004 | Usoro et al. | 475/276 |
| 6,736,752 B2 | * | 5/2004 | Usoro et al. | 475/296 |

FOREIGN PATENT DOCUMENTS

JP 02072246 A * 3/1990 ............. F16H 3/66

* cited by examiner

Primary Examiner—Rodney H. Bonck
Assistant Examiner—David D. Le
(74) Attorney, Agent, or Firm—Kathryn A. Marra

(57) ABSTRACT

The family of transmissions has a plurality of members that can be utilized in powertrains to provide six forward speed ratios and a reverse speed ratio. The transmission family members include three planetary gear sets having five torque-transmitting mechanisms, two fixed interconnections, and one grounded planetary gear member. The powertrain includes an engine and torque converter that is continuously connected to at least one of the planetary gear members and an output member that is continuously connected with another one of the planetary gear members. The five torque-transmitting mechanisms provide interconnections between various gear members, the fixed interconnections, the input shaft, the output shaft, and the transmission housing, and are operated in combinations of two to establish six forward speed ratios and one reverse speed ratio.

5 Claims, 9 Drawing Sheets

| | RATIOS | 50 | 52 | 54 | 56 | 58 |
|---|---|---|---|---|---|---|
| REVERSE | -5 | | X | | | X |
| NEUTRAL | 0 | | | | | X |
| 1 | 4.2 | | | X | | X |
| 2 | 2.17 | | | X | X | |
| 3 | 1.54 | | X | X | | |
| 4 | 1 | X | | X | | |
| 5 | 0.73 | X | X | | | |
| 6 | 0.64 | X | | | X | |

(X = ENGAGED CLUTCH)

$\frac{\text{RING GEAR}}{\text{SUN GEAR}}$ TOOTH RATIO: $\frac{N_{R1}}{N_{S1}} = 1.88$, $\frac{N_{R2}}{N_{S2}} = 1.74$, $\frac{N_{R3}}{N_{S3}} = 2.41$

| RATIO SPREAD | 6.61 |
|---|---|
| RATIO STEPS | |
| REV/1 | -1.19 |
| 1/2 | 1.94 |
| 2/3 | 1.4 |
| 3/4 | 1.54 |
| 4/5 | 1.37 |
| 5/6 | 1.14 |

| | RATIOS | 150 | 152 | 154 | 156 | 158 |
|---|---|---|---|---|---|---|
| REVERSE | -1.09 | X | | | | X |
| NEUTRAL | 0 | | | | | X |
| 1 | 5.2 | | X | | | X |
| 2 | 2.55 | | | X | | X |
| 3 | 1.57 | | | X | X | |
| 4 | 1 | | X | X | | |
| 5 | 0.83 | X | | X | | |
| 6 | 0.74 | X | X | | | |

(X = ENGAGED CLUTCH)

$\frac{\text{RING GEAR}}{\text{SUN GEAR}}$ TOOTH RATIO: $\frac{N_{R1}}{N_{S1}} = 1.77, \frac{N_{R2}}{N_{S2}} = 1.71, \frac{N_{R3}}{N_{S3}} = 1.55$

| RATIO SPREAD | 8.14 |
|---|---|
| RATIO STEPS | |
| REV/1 | -0.21 |
| 1/2 | 2.04 |
| 2/3 | 1.62 |
| 3/4 | 1.57 |
| 4/5 | 1.20 |
| 5/6 | 1.12 |

| | RATIOS | 250 | 252 | 254 | 256 | 258 |
|---|---|---|---|---|---|---|
| REVERSE | -5 | | X | | | X |
| NEUTRAL | 0 | | | | | X |
| 1 | 4.2 | | | X | | X |
| 2 | 2.17 | | | X | X | |
| 3 | 1.54 | | X | X | | |
| 4 | 1 | X | | X | | |
| 5 | 0.73 | X | X | | | |
| 6 | 0.64 | X | | | X | |

(X = ENGAGED CLUTCH)

$\dfrac{\text{RING GEAR}}{\text{SUN GEAR}}$ TOOTH RATIO: $\dfrac{N_{R1}}{N_{S1}} = 1.88$, $\dfrac{N_{R2}}{N_{S2}} = 1.74$, $\dfrac{N_{R3}}{N_{S3}} = 2.41$

| RATIO SPREAD | 6.61 |
|---|---|
| RATIO STEPS | |
| REV/1 | -1.19 |
| 1/2 | 1.94 |
| 2/3 | 1.4 |
| 3/4 | 1.54 |
| 4/5 | 1.37 |
| 5/6 | 1.14 |

| | RATIOS | 350 | 352 | 354 | 356 | 358 |
|---|---|---|---|---|---|---|
| REVERSE | -1.09 | X | | | | X |
| NEUTRAL | 0 | | | | | X |
| 1 | 5.2 | | X | | | X |
| 2 | 2.55 | | | X | | X |
| 3 | 1.57 | | | X | X | |
| 4 | 1 | | X | X | | |
| 5 | 0.83 | X | | | X | |
| 6 | 0.74 | X | | X | | |

(X = ENGAGED CLUTCH)

$\dfrac{\text{RING GEAR}}{\text{SUN GEAR}}$ TOOTH RATIO: $\dfrac{N_{R1}}{N_{S1}} = 1.77$, $\dfrac{N_{R2}}{N_{S2}} = 1.71$, $\dfrac{N_{R3}}{N_{S3}} = 1.55$

| RATIO SPREAD | 8.14 |
|---|---|
| RATIO STEPS | |
| REV/1 | -0.21 |
| 1/2 | 2.04 |
| 2/3 | 1.62 |
| 3/4 | 1.57 |
| 4/5 | 1.20 |
| 5/6 | 1.12 |

| | RATIOS | 450 | 452 | 454 | 456 | 458 |
|---|---|---|---|---|---|---|
| REVERSE | -1.12 | X | | | X | |
| NEUTRAL | 0 | X | | | | |
| 1 | 2.23 | X | | | | X |
| 2 | 1.43 | | | X | | X |
| 3 | 0.74 | | X | | | X |
| 4 | 0.46 | | X | | X | |
| 5 | 0.40 | | X | X | | |
| 6 | 0.26 | | | X | X | |

(X = ENGAGED CLUTCH)

$\frac{\text{RING GEAR}}{\text{SUN GEAR}}$ TOOTH RATIO: $\frac{N_{R1}}{N_{S1}} = 1.87$, $\frac{N_{R2}}{N_{S2}} = 1.60$, $\frac{N_{R3}}{N_{S3}} = 2.90$

| RATIO SPREAD | 8.57 |
|---|---|
| RATIO STEPS | |
| REV/1 | -0.50 |
| 1/2 | 1.56 |
| 2/3 | 1.93 |
| 3/4 | 1.61 |
| 4/5 | 1.15 |
| 5/6 | 1.54 |

| | RATIOS | 550 | 552 | 554 | 556 | 558 |
|---|---|---|---|---|---|---|
| REVERSE | -1.12 | X | | | X | |
| NEUTRAL | 0 | X | | | | |
| 1 | 2.23 | X | | | | X |
| 2 | 1.43 | | | X | | X |
| 3 | 0.74 | | X | | | X |
| 4 | 0.46 | | X | | X | |
| 5 | 0.40 | | X | X | | |
| 6 | 0.26 | | | X | X | |

(X = ENGAGED CLUTCH)

$\dfrac{\text{RING GEAR}}{\text{SUN GEAR}}$ TOOTH RATIO: $\dfrac{N_{R1}}{N_{S1}} = 1.87$, $\dfrac{N_{R2}}{N_{S2}} = 1.60$, $\dfrac{N_{R3}}{N_{S3}} = 2.90$

| RATIO SPREAD | 8.57 |
|---|---|
| RATIO STEPS | |
| REV/1 | -0.50 |
| 1/2 | 1.56 |
| 2/3 | 1.93 |
| 3/4 | 1.61 |
| 4/5 | 1.15 |
| 5/6 | 1.54 |

|  | RATIOS | 650 | 652 | 654 | 656 | 658 |
|---|---|---|---|---|---|---|
| REVERSE | -2.93 | X |  |  |  | X |
| NEUTRAL | 0 | X |  |  |  |  |
| 1 | 5.52 | X |  | X |  |  |
| 2 | 2.87 |  | X | X |  |  |
| 3 | 1.51 |  |  | X |  | X |
| 4 | 1.21 |  |  | X | X |  |
| 5 | 1.00 |  |  |  | X | X |
| 6 | 0.75 |  | X |  | X |  |

(X = ENGAGED CLUTCH)

$\frac{\text{RING GEAR}}{\text{SUN GEAR}}$ TOOTH RATIO: $\frac{N_{R1}}{N_{S1}} = 2.99$, $\frac{N_{R2}}{N_{S2}} = 2.93$, $\frac{N_{R3}}{N_{S3}} = 1.88$

| RATIO SPREAD | 7.41 |
|---|---|
| RATIO STEPS |  |
| REV/1 | -0.53 |
| 1/2 | 1.92 |
| 2/3 | 1.90 |
| 3/4 | 1.24 |
| 4/5 | 1.21 |
| 5/6 | 1.34 |

| | RATIOS | 750 | 752 | 754 | 756 | 758 |
|---|---|---|---|---|---|---|
| REVERSE | -5 | | X | | | X |
| NEUTRAL | 0 | | | | | X |
| 1 | 4.2 | | | X | | X |
| 2 | 2.17 | | | X | X | |
| 3 | 1.54 | | X | X | | |
| 4 | 1 | X | | X | | |
| 5 | 0.73 | X | X | | | |
| 6 | 0.64 | X | | | X | |

(X = ENGAGED CLUTCH)

$\frac{\text{RING GEAR}}{\text{SUN GEAR}}$ TOOTH RATIO: $\frac{N_{R1}}{N_{S1}} = 2.88$, $\frac{N_{R2}}{N_{S2}} = 1.74$, $\frac{N_{R3}}{N_{S3}} = 2.41$

| RATIO SPREAD | 6.61 |
|---|---|
| RATIO STEPS | |
| REV/1 | -1.19 |
| 1/2 | 1.94 |
| 2/3 | 1.4 |
| 3/4 | 1.54 |
| 4/5 | 1.37 |
| 5/6 | 1.14 |

| RATIOS | | 850 | 852 | 854 | 856 | 858 |
|---|---|---|---|---|---|---|
| REVERSE | -1.09 | X | | | | X |
| NEUTRAL | 0 | | | | | X |
| 1 | 5.2 | | | X | | X |
| 2 | 2.55 | | | | X | X |
| 3 | 1.57 | | | | X | X |
| 4 | 1 | | X | | X | |
| 5 | 0.83 | X | | | X | |
| 6 | 0.74 | X | X | | | |

(X = ENGAGED CLUTCH)

$\frac{\text{RING GEAR}}{\text{SUN GEAR}}$ TOOTH RATIO: $\frac{N_{R1}}{N_{S1}} = 1.77$, $\frac{N_{R2}}{N_{S2}} = 1.71$, $\frac{N_{R3}}{N_{S3}} = 2.55$

| RATIO SPREAD | 8.14 |
|---|---|
| RATIO STEPS | |
| REV/1 | -0.21 |
| 1/2 | 2.04 |
| 2/3 | 1.62 |
| 3/4 | 1.57 |
| 4/5 | 1.20 |
| 5/6 | 1.12 |

MULTI-SPEED PLANETARY TRANSMISSION MECHANISMS WITH A STATIONARY PLANETARY MEMBER AND TWO BRAKES

TECHNICAL FIELD

The present invention relates to a family of power transmissions having three planetary gear sets that are controlled by five torque-transmitting devices to provide six forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had planetary gear sets with two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, multi-speed manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; U.S. Pat. No. 5,599,251 issued to Beim and McCarrick on Feb. 4, 1997; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

SUMMARY OF THE INVENTION

It is an object of the present invention to provide an improved family of transmissions having three planetary gear sets controlled to provide six forward speed ratios and one reverse speed ratio.

In one aspect of the present invention, the family of transmissions has three planetary gear sets, each of which includes a first, second and third member, which members may comprise a sun gear, a ring gear, or a planet carrier assembly member.

In referring to the first, second and third gear sets in this description and in the claims, these sets may be counted "first" to "third" in any order in the drawings (i.e., left to right, right to left, etc.).

In another aspect of the present invention, each of the planetary gear sets may be of the single pinion-type or of the double pinion-type.

In yet another aspect of the present invention, a first member of the first planetary gear set is continuously interconnected to a first member of the second planetary gear set through a first interconnecting member.

In yet another aspect of the present invention, a second member of the second planetary gear set is continuously interconnected to a first member of the third planetary gear set through a second interconnecting member.

In yet another aspect of the present invention, a second member of the first planetary gear set is continuously connected to a stationary transmission housing.

In yet a further aspect of the invention, each family member incorporates an input shaft which is continuously connected with a member of the second or third planetary gear set, and an output shaft which is continuously connected with another member of the second or third planetary gear set.

In still a further aspect of the invention, a first torque-transmitting mechanism, such as a brake, selectively interconnects a member of the first planetary gear set with the transmission housing.

In another aspect of the invention, a second torque-transmitting mechanism, such as a brake, selectively interconnects a member of the second or third planetary gear set with the stationary member.

In a still further aspect of the invention, a third torque-transmitting mechanism, such as a clutch, selectively interconnects a member of the first planetary gear set with a member of the second or third planetary gear set.

In a still further aspect of the invention, a fourth torque-transmitting mechanism, such as a clutch, selectively interconnects a member of the third planetary gear set with a member of the first or second planetary gear set.

In a still further aspect of the invention, a fifth torque-transmitting mechanism, such as a clutch, selectively interconnects a member of the first, second or third planetary gear set with another member of the first, second or third planetary gear set.

In still another aspect of the invention, the five torque-transmitting mechanisms are selectively engageable in combinations of two to yield six forward speed ratios and one reverse speed ratio.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention; and FIG. 9b is a truth table and chart depicting some of the operating characteristics of the powertrain shown in FIG. 9a.

DESCRIPTION OF THE PREFERRED EMBODIMENTS

Figures 1A, 1B:
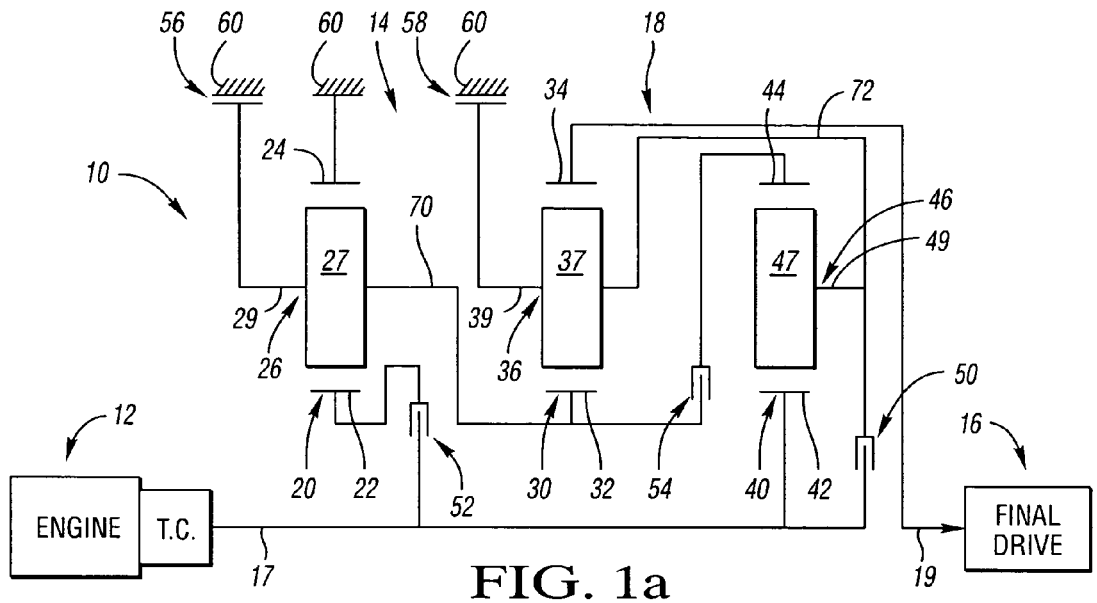

Referring to the drawings, wherein like characters represent the same or corresponding parts throughout the several views, there is shown in FIG. 1a a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly 26. The planet carrier assembly 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement also includes five torque-transmitting mechanisms 50, 52, 54, 56 and 58. The torque-transmitting mechanisms 50, 52 and 54 are rotating-type torque-transmitting mechanisms, commonly termed clutches. The torque-transmitting mechanisms 56, 58 are stationary-type torque transmitting mechanisms, commonly termed brakes or reaction clutches.

The input shaft 17 is continuously connected with the sun gear member 42, and the output shaft 19 is continuously connected with the ring gear member 34. The planet carrier assembly member 26 is continuously connected with the sun gear member 32 through the interconnecting member 70. The planet carrier assembly member 36 is continuously connected with the planet carrier assembly member 46 through the interconnecting member 72. The ring gear member 24 is continuously connection with the transmission housing 60.

The planet carrier assembly member 46 is selectively connectable with the sun gear member 42 through the clutch 50. The sun gear member 22 is selectively connectable with the sun gear member 42 through the clutch 52. The sun gear member 32 is selectively connectable with the ring gear member 44 through the clutch 54. The planet carrier assembly member 26 is selectively connectable with the transmission housing 60 through the brake 56. The planet carrier assembly member 36 is selectively connectable with the transmission housing 60 through the brake 58.

As shown in FIG. 1b, and in particular the truth table disclosed therein, the torque-transmitting mechanisms are selectively engaged in combinations of two to provide six forward speed ratios and a reverse speed ratio.

The reverse speed ratio is established with the engagement of the clutch 52 and the brake 58. The clutch 52 connects the sun gear member 22 with the sun gear member 42, and the brake 58 connects the planet carrier assembly member 36 with the transmission housing 60. The ring gear member 24 does not rotate. The sun gear members 22, 42 rotate at the same speed as the input shaft 17. The planet carrier assembly member 26 rotates at the same speed as the sun gear member 32. The speed of the planet carrier assembly member 26 is determined from the speed of the sun gear member 22 and the ring gear/sun gear tooth ratio of the planetary gear set 20. The planet carrier assembly members 36, 46 do not rotate. The ring gear member 34 rotates at the same speed as the output shaft 19. The ring gear member 34, and therefore the output shaft 19, rotates at a speed determined from the speed of the sun gear member 32 and the ring gear/sun gear tooth ratio of the planetary gear set 30. The numerical value of the reverse speed ratio is determined utilizing the ring gear/sun gear tooth ratios of the planetary gear sets 20 and 30.

The first forward speed ratio is established with the engagement of the clutch 54 and the brake 58. The clutch 54 connects the sun gear member 32 with the ring gear member 44. The brake 58 connects the planet carrier assembly member 36 with the transmission housing 60. The ring gear member 24 does not rotate. The planet carrier assembly member 26 rotates at the same speed as the sun gear member 32 and the ring gear member 44. The planet carrier assembly members 36, 46 do not rotate. The ring gear member 34 rotates at the same speed as the output shaft 19. The ring gear member 34, and therefore the output shaft 19, rotates at a speed determined from the speed of the sun gear member 32 and the ring gear/sun gear tooth ratio of the planetary gear set 30. The sun gear member 42 rotates at the same speed as the input shaft 17. The ring gear member 44 rotates at a speed determined from speed of the sun gear member 42 and the ring gear/sun gear tooth ratio of the planetary gear set 40. The numerical value of the first forward speed ratio is determined utilizing the ring gear/sun gear tooth ratios of the planetary gear sets 30 and 40.

The second forward speed ratio is established with the engagement of the clutch 54 and the brake 56. The clutch 54 connects the sun gear member 32 with the ring gear member 44, and the brake 56 connects the planet carrier assembly member 26 with the transmission housing 60. The planetary gear set 20, sun gear member 32 and ring gear member 44 do not rotate. The planet carrier assembly member 36 rotates at the same speed as the planet carrier assembly member 46. The ring gear member 34 rotates at the same speed as the output shaft 19. The ring gear member 34, and therefore the output shaft 19, rotates at a speed determined from the speed of the planet carrier assembly member 36 and the ring gear/sun gear tooth ratio of the planetary gear set 30. The sun gear member 42 rotates at the same speed as the input shaft 17. The planet carrier assembly member 46 rotates at a speed determined from the speed of the sun gear member 42 and the ring gear/sun gear tooth ratio of the planetary gear set 40. The numerical value of the second forward speed ratio is determined utilizing the ring gear/sun gear tooth ratios of the planetary gear sets 30, 40.

The third forward speed ratio is established with the engagement of the clutches 52, 54. The clutch 52 connects the sun gear member 22 with the sun gear member 42. The clutch 54 connects the sun gear member 32 with the ring gear member 44. The ring gear member 24 does not rotate. The planet carrier assembly member 26 rotates at the same speed as the sun gear member 32 and the ring gear member 44. The sun gear members 22, 42 rotate at the same speed as the input shaft 17. The speed of the planet carrier assembly member 26 is determined from the speed of the sun gear member 22 and the ring gear/sun gear tooth ratio of the planetary gear set 20. The planet carrier assembly member 36 rotates at the same speed as the planet carrier assembly member 46. The ring gear member 34 rotates at the same speed as the output shaft 19. The ring gear member 34, and therefore the output shaft 19, rotates at a speed determined from the speed of the planet carrier assembly member 36, the speed of the sun gear member 32, and the ring gear/sun gear tooth ratio of the planetary gear set 30. The speed of the planet carrier assembly member 46 is determined from the speed of the ring gear member 44, the speed of the sun gear member 42, and the ring gear/sun gear tooth ratio of the planetary gear set 40. The numerical value of the third forward speed ratio is determined utilizing the ring gear/sun gear tooth ratios of the planetary gear sets 20, 30 and 40.

The fourth forward speed ratio is established with the engagement of the clutches 50, 54. In this configuration, the input shaft 17 is directly connected with the output shaft 19. The numerical value of the fourth forward speed ratio is 1.

The fifth forward speed ratio is established with the engagement of the clutches 50, 52. The clutch 50 connects the planet carrier assembly member 46 with the sun gear member 42. The clutch 52 connects the sun gear member 22 with the sun gear member 42. The ring gear member 24 does not rotate. The sun gear member 22, planet carrier assembly member 36, and planetary gear set 40 rotate at the same speed as the input shaft 17. The planet carrier assembly member 26 rotates at the same speed as the ring gear member 32. The planet carrier assembly member 26 rotates at a speed determined from the speed of the sun gear member 22 and the ring gear/sun gear tooth ratio of the planetary gear set 20. The ring gear member 34 rotates at the same speed as the output shaft 19. The ring gear member 34, and therefore the output shaft 19, rotates at a speed determined from the speed of the planet carrier assembly member 36, the speed of the sun gear member 32, and the ring gear/sun gear tooth ratio of the planetary gear set 30. The numerical value of the fifth forward speed ratio is determined utilizing the ring gear/sun gear tooth ratios of the planetary gear sets 20, 30.

The sixth forward speed ratio is established with the engagement of the clutch 50 and the brake 56. The clutch 50 connects the planet carrier assembly member 46 with the sun gear member 42, and the brake 56 connects the planet carrier assembly member 26 with the transmission housing 60. The planetary gear set 20 and sun gear member 32 do not rotate. The planet carrier assembly member 36 and the planetary gear set 40 rotate at the same speed as the input shaft 17. The ring gear member 34 rotates at the same speed as the output shaft 19. The ring gear member 34, and therefore the output shaft 19, rotates at a speed determined from the speed of the planet carrier assembly member 36 and the ring gear/sun gear tooth ratio of the planetary gear set 30. The numerical value of sixth forward speed ratio is determined utilizing the ring gear/sun gear tooth ratio of the planetary gear set 30.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; and the R3/S3 value is the tooth ratio of the planetary gear set 40. Also, the chart of FIG. 1b describes the ratio steps that are attained utilizing the sample of tooth ratios given. For example, the step ratio between the first and second forward speed ratios is 1.94, while the step ratio between the reverse and first forward ratio is −1.19.

Figures 2A, 2B:
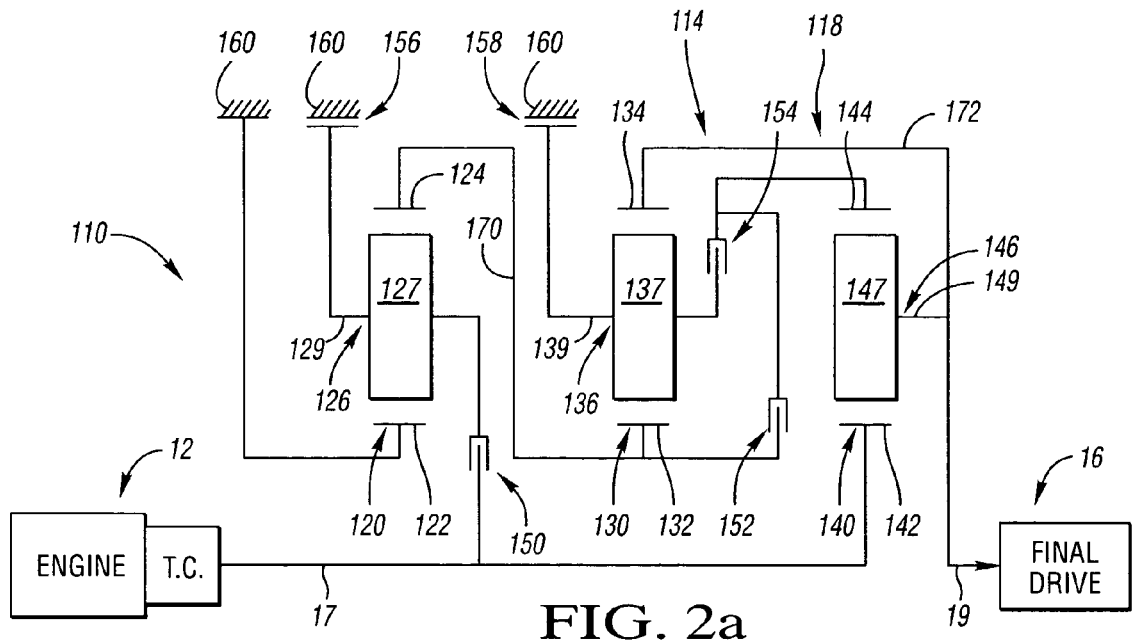

FIG. 2a shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly 126. The planet carrier assembly 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes five torque-transmitting mechanisms 150, 152, 154, 156 and 158. The torque-transmitting mechanisms 150, 152 and 154 are rotating-type torque-transmitting mechanisms, commonly termed clutches. The torque-transmitting mechanisms 156, 158 are stationary-type torque transmitting mechanisms, commonly termed brakes or reaction clutches.

The input shaft 17 is continuously connected with the sun gear member 142, and the output shaft 19 is continuously connected with the planet carrier assembly member 146. The ring gear member 124 is continuously connected with the sun gear member 132 through the interconnecting member 170. The ring gear member 134 is continuously connected with the planet carrier assembly member 146 through the interconnecting member 172. The sun gear member 122 is continuously connected with the transmission housing 160.

The planet carrier assembly member 126 is selectively connectable with the sun gear member 142 through the clutch 150. The sun gear member 132 is selectively connectable with the ring gear member 144 through the clutch 152. The planet carrier assembly member 136 is selectively connectable with the ring gear member 144 through the clutch 154. The planet carrier assembly member 126 is selectively connectable with the transmission housing 160 through the brake 156. The planet carrier assembly member 136 is selectively connectable with the transmission housing 160 through the brake 158.

The truth table of FIG. 2b describes the engagement sequence utilized to provide six forward speed ratios and a reverse speed ratio in the planetary gear arrangement 118 shown in FIG. 2a.

The reverse speed ratio is established with the engagement of the clutch 150 and the brake 158. The clutch 150 connects the planet carrier assembly member 126 with the sun gear member 142, and the brake 158 connects the planet carrier assembly member 136 with the transmission housing 160. The sun gear member 122 does not rotate. The planet carrier assembly member 126 and sun gear member 142 rotate at the same speed as the input shaft 17. The ring gear member 124 rotates at the same speed as the sun gear member 132. The speed of the ring gear member 124 is determined from the speed of the planet carrier assembly member 126 and the ring gear/sun gear tooth ratio of the planetary gear set 120. The planet carrier assembly member 136 does not rotate. The ring gear member 134 and planet carrier assembly member 146 rotate at the same speed as the output shaft 19. The speed of the ring gear member 134, and therefore the output shaft 19, is determined from the speed of the sun gear member 132 and the ring gear/sun gear tooth ratio of the planetary gear set 130. The numerical value of the reverse speed ratio is determined utilizing the ring gear/sun gear tooth ratios of the planetary gear sets 120, 130.

The first forward speed ratio is established with the engagement of the clutch 152 and the brake 158. The clutch 152 connects the sun gear member 132 with the ring gear member 144, and the brake 158 connects the planet carrier assembly member 136 with the transmission housing 160. The sun gear member 122 does not rotate. The ring gear member 124 rotates at the same speed as the sun gear member 132 and the ring gear member 144. The planet carrier assembly member 136 does not rotate. The ring gear member 134 and the planet carrier assembly member 146 rotate at the same speed as the output shaft 19. The ring gear member 134 rotates at a speed determined from the speed of the sun gear member 132 and the ring gear/sun gear tooth ratio of the planetary gear set 130. The sun gear member 142 rotates at the same speed as the input shaft 17. The planet carrier assembly member 146, and therefore the output shaft 19, rotates at a speed determined from the speed of the ring gear member 144, the speed of the sun gear member 142, and the ring gear/sun tooth ratio of the planetary gear set 140. The numerical value of the first forward speed ratio is determined utilizing the ring gear/sun gear ratios of the planetary gear sets 130, 140.

The second forward speed ratio is established with the engagement of the clutch 154 and the brake 158. The clutch 154 connects the planet carrier assembly member 136 with the ring gear member 144, and the brake 158 connects the planet carrier assembly member 136 with the transmission housing 160. The sun gear member 122 does not rotate. The ring gear member 124 rotates at the same speed as the sun gear member 132. The planet carrier assembly member 136 and ring gear member 144 do not rotate. The ring gear member 134 and planet carrier assembly member 146 rotate at the same speed as the output shaft 19. The sun gear member 142 rotates at the same speed as the input shaft 17. The planet carrier assembly member 146, and therefore the output shaft 19, rotates at a speed determined from the speed of the sun gear member 142 and the ring gear/sun gear tooth ratio of the planetary gear set 140. The numerical value of the second forward speed ratio is determined utilizing the ring gear/sun gear tooth ratio of the planetary gear set 140.

The third forward speed ratio is established with the engagement of the clutch 154 and the brake 156. The clutch 154 connects the planet carrier assembly member 136 with the ring gear member 144, and the brake 156 connects the planet carrier assembly member 126 with the transmission housing 160. The planetary gear set 120 and sun gear member 132 do not rotate. The ring gear member 134 and planet carrier assembly member 146 rotate at the same speed as the output shaft 19. The planet carrier assembly member 136 rotates at the same speed as the ring gear member 144. The planet carrier assembly member 136 rotates at a speed determined from the speed of the ring gear member 134 and the ring gear/sun gear tooth ratio of the planetary gear set 130. The sun gear member 142 rotates at the same speed as the input shaft 17. The planet carrier assembly member 146, and therefore the output shaft 19, rotates at a speed determined from the speed of the ring gear member 144, the speed of the sun gear member 142, and the ring gear/sun gear tooth ratio of the planetary gear set 140. The numerical value of the third forward speed ratio is determined utilizing the ring gear/sun gear tooth ratios of the planetary gear sets 130, 140.

The fourth forward speed ratio is established with the engagement of the clutches 152, 154. In this configuration, the input shaft 17 is directly connected to the output shaft 19. The numerical value of the fourth forward speed ratio is 1.

The fifth forward speed ratio is established with the engagement of the clutches 150, 154. The clutch 150 connects the planet carrier assembly member 126 with the sun gear member 142, and the clutch 154 connects the planet carrier assembly member 136 with the ring gear member 144. The sun gear member 122 does not rotate. The ring gear member 124 rotates at the same speed as the sun gear member 132. The planet carrier assembly member 126 rotates at the same speed as the sun gear member 142. The planet carrier assembly member 126 rotates at a speed determined from the speed of the ring gear member 124 and the ring gear/sun gear tooth ratio of the planet carrier assembly member 120. The ring gear member 134 and planet carrier assembly member 146 rotate at the same speed as the output shaft 19. The planet carrier assembly member 136 rotates at the same speed as the ring gear member 144. The planet carrier assembly member 136 rotates at a speed determined from the speed ring gear 134, the speed of the sun gear member 132, and the ring gear/sun gear tooth ratio of the planetary gear set 130. The planet carrier assembly member 146, and therefore the output shaft 19, rotates at a speed determined from the speed of the ring gear member 144, the speed of the sun gear member 142, and the ring gear/sun gear tooth ratio of the planetary gear set 140.

The sixth forward speed ratio is established with the engagement of the clutches 150, 152. The clutch 150 connects the planet carrier assembly member 126 with the sun gear member 142, and the clutch 152 connects the sun gear member 132 with the ring gear member 144. The sun gear member 122 does not rotate. The planet carrier assembly member 126 and sun gear member 142 rotate at the same speed as the input shaft 17. The ring gear member 124 rotates at the same speed as the sun gear member 132 and the ring gear member 144. The speed of the ring gear member 124 is determined from the speed of the planet carrier assembly member 126 and the ring gear/sun gear tooth ratio of the planetary gear set 120. The ring gear member 134 and planet carrier assembly member 146 rotate at the same speed as the output shaft 19. The speed of the planet carrier assembly member 146, and therefore the output shaft 19, is determined from the speed of the ring gear member 144, the speed of the sun gear member 142, and the ring gear/sun gear tooth ratio of the planetary gear set 140. The numerical of the sixth forward speed ratio is determined utilizing the ring gear/sun gear tooth ratios of the planetary gear sets 120, 140.

As set forth above, the truth table of FIG. 2*b* describes the engagement sequence of the torque-transmitting mechanisms utilized to provide the reverse drive ratio and six forward speed ratios. The truth table also provides an example of the ratios that can be attained with the family members shown in FIG. 2*a* utilizing the sample tooth ratios given in FIG. 2*b*. The R1/S1 value is the tooth ratio of the planetary gear set 120; the R2/S2 value is the tooth ratio of the planetary gear set 130; and the R3/S3 value is the tooth ratio of the planetary gear set 140. Also shown in FIG. 2*b* are the ratio steps between single step ratios in the forward direction as well as the reverse to first ratio step ratio. For example, the first to second step ratio is 2.04. It should also be noted that the single step forward ratio interchanges are of the single transition variety.

Figures 3A, 3B:
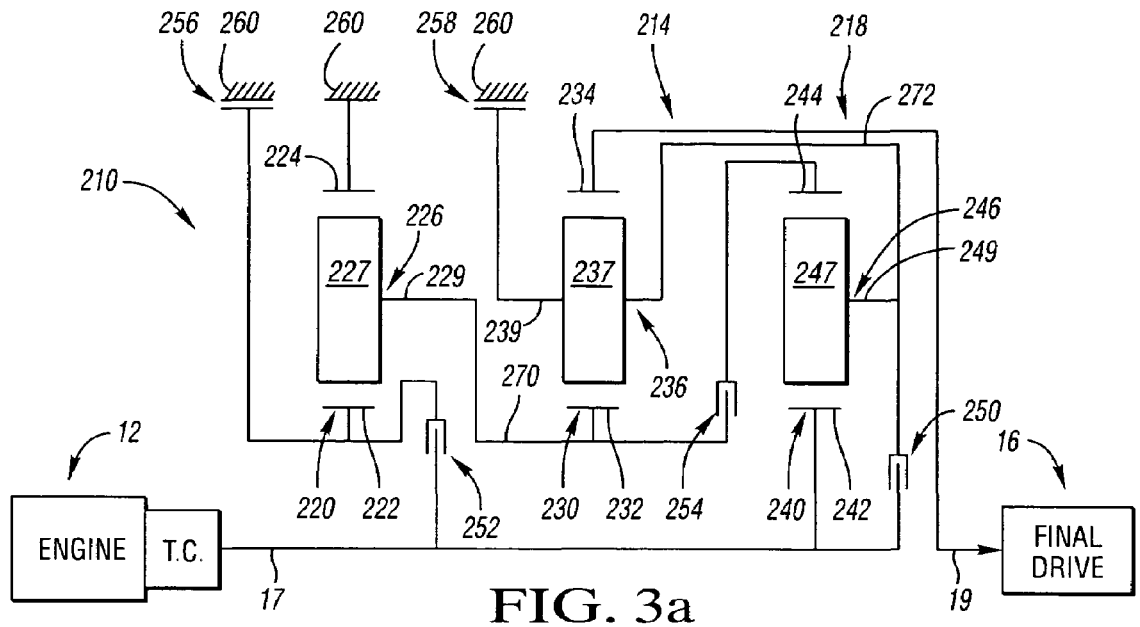

Turning to FIG. 3*a*, a powertrain 210 includes the engine and torque converter 12, a planetary transmission 214, and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes five torque-transmitting mechanisms 250, 252, 254, 256 and 258. The torque-transmitting mechanisms 250, 252 and 254 are rotating type torque-transmitting mechanisms, commonly termed clutches. The torque-transmitting mechanisms 256 and 258 are stationary-type torque transmitting mechanisms, commonly termed brakes or reaction clutches.

The input shaft 17 is continuously connected with the sun gear member 242, and the output shaft 19 is continuously connected with the ring gear member 234. The planet carrier assembly member 226 is continuously connected with the sun gear member 232 through the interconnecting member 270. The planet carrier assembly member 236 is continuously connected with the planet carrier assembly member 246 through the interconnecting member 272. The ring gear member 224 is continuously connected with the transmission housing 260.

The planet carrier assembly member 246 is selectively connectable with the sun gear member 242 through the clutch 250. The sun gear member 222 is selectively connectable with the sun gear member 242 through the clutch 252. The sun gear member 232 is selectively connectable with the ring gear member 244 through the clutch 254. The sun gear member 222 is selectively connectable with the transmission housing 260 through the brake 256. The planet carrier assembly member 236 is selectively connectable with the transmission housing 260 through the brake 258.

As shown in the truth table in FIG. 3*b*, the torque-transmitting mechanisms are engaged in combinations of two to establish six forward speed ratios and a reverse speed ratio.

The truth tables given in FIGS. 3*b*, 4*b*, 5*b*, 6*b*, 7*b*, 8*b* and 9*b* show the engagement sequences for the torque-transmitting mechanisms to provide six forward speed ratios and one reverse ratio. As shown and described above for the configuration in FIGS. 1*a* and 2*a*, those skilled in the art will understand from the respective truth tables how the speed ratios are established through the planetary gear sets identified in the written description.

As previously set forth, the truth table of FIG. 3b describes the combinations of engagements utilized for the six forward speed ratios and the reverse ratio. The truth table also provides an example of speed ratios that are available with the family member described above. These examples of speed ratios are determined utilizing the tooth ratios given in FIG. 3b. The R1/S1 value is the tooth ratio of the planetary gear set 220; the R2/S2 value is the tooth ratio of the planetary gear set 230; and the R3/S3 value is the tooth ratio of the planetary gear set 240. Also depicted in FIG. 3b is a chart representing the ratio steps between adjacent forward speed ratios and the reverse speed ratio. For example, the first to second ratio interchange has a step of 1.94. It can also be readily determined from the truth table of FIG. 3b that all of the single step forward ratio interchanges are of the single transition variety. The double step forward ratios are of the single transition variety as well.

Figures 4A, 4B:
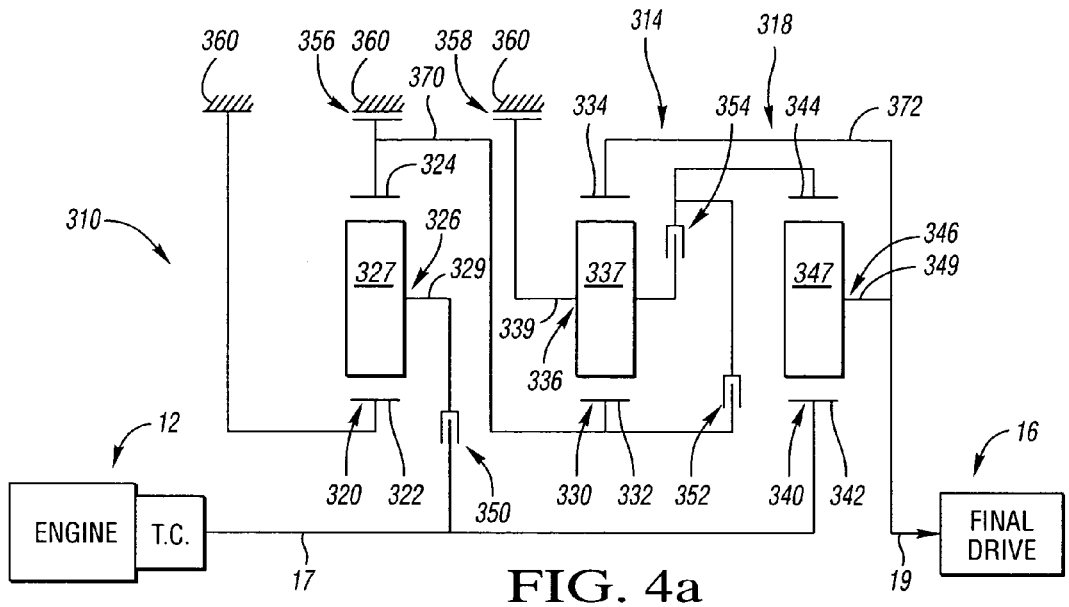

A powertrain 310, shown in FIG. 4a, includes the engine and torque converter 12, a planetary transmission 314, and the final drive mechanism 16. The planetary transmission 314 includes an input shaft 17 continuously connected with the engine and torque converter 12, a planetary gear arrangement 318, and output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes five torque-transmitting mechanisms 350, 352, 354, 356 and 358. The torque-transmitting mechanisms 350, 352 and 354 are rotating type torque-transmitting mechanisms, commonly termed clutches. The torque-transmitting mechanisms 356 and 358 are stationary-type torque transmitting mechanisms, commonly termed brakes or reaction clutches.

The input shaft 17 is continuously connected with the sun gear member 342, and the output shaft 19 is continuously connected with the planet carrier assembly member 346. The ring gear member 324 is continuously connected with the sun gear member 332 through the interconnecting member 370. The ring gear member 334 is continuously connected with the planet carrier assembly member 346 through the interconnecting member 372. The sun gear member 322 is continuously connected with the transmission housing 360.

The planet carrier assembly member 326 is selectively connectable with the sun gear member 342 through the clutch 350. The sun gear member 332 is selectively connectable with the ring gear member 344 through the clutch 352. The planet carrier assembly member 336 is selectively connectable with the ring gear member 344 through the clutch 354. The ring gear member 324 is selectively connectable with the transmission housing 360 through the brake 356. The planet carrier assembly member 336 is selectively connectable with the transmission housing 360 through the brake 358.

The truth table shown in FIG. 4b describes the engagement combination and the engagement sequence necessary to provide the reverse drive ratio and six forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; and the R3/S3 value is the tooth ratio for the planetary gear set 340. Also given in FIG. 4b is a chart describing the step ratios between the adjacent forward speed ratios and the reverse to first forward speed ratio. For example, the first to second forward speed ratio step is 2.04. It can be readily determined from the truth table of FIG. 4b that each of the forward single step ratio interchanges is a single transition shift.

Figures 5A, 5B:
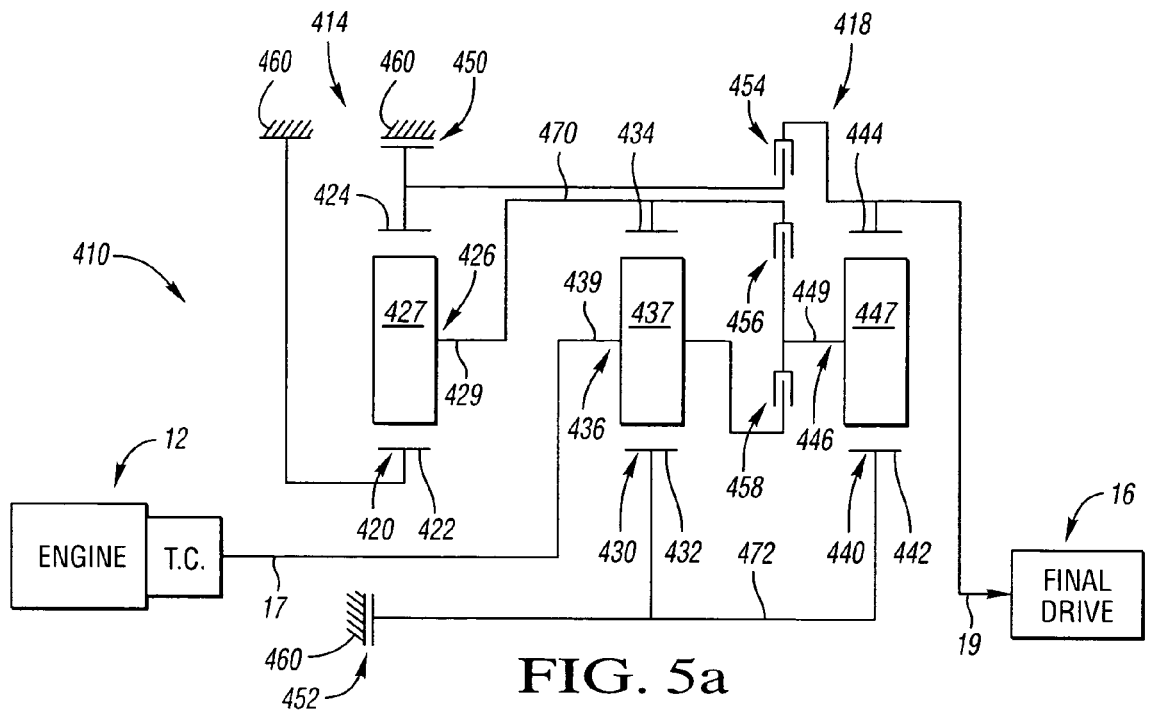

A powertrain 410, shown in FIG. 5a, includes the engine and torque converter 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly 426. The planet carrier assembly 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes five torque-transmitting mechanisms 450, 452, 454, 456 and 458. The torque-transmitting mechanisms 450, 452 are stationary-type torque transmitting mechanisms, commonly termed brakes or reaction clutches. The torque-transmitting mechanisms 454, 456 and 458 are rotating type torque-transmitting mechanisms, commonly termed clutches.

The input shaft 17 is continuously connected with the planet carrier assembly member 436, and the output shaft 19 is continuously connected with the ring gear member 444. The planet carrier assembly member 426 is continuously connected with the ring gear member 434 through the interconnecting member 470. The sun gear member 432 is continuously connected with the sun gear member 442 through the interconnecting member 472. The sun gear member 422 is continuously connected with the transmission housing 460.

The ring gear member 424 is selectively connectable with the transmission housing 460 through the brake 450. The sun gear member 432 is selectively connectable with the transmission housing 460 through the brake 452. The ring gear member 424 is selectively connectable with the ring gear member 444 through the clutch 454. The ring gear member 434 is selectively connectable with the planet carrier assembly member 446 through the clutch 456. The planet carrier assembly member 436 is selectively connectable with the planet carrier assembly member 446 through the clutch 458.

The truth table shown in FIG. 5b describes the engagement combination and sequence of the torque-transmitting mechanisms 450, 452, 454, 456 and 458 that are employed to provide the reverse drive ratio and the six forward speed ratios. It should be noted that the torque-transmitting mechanism 450 remains engaged through the neutral condition to simplify the forward/reverse interchange.

Also given in the truth table of FIG. 5b is a set of numerical values that are attainable with the present invention utilizing the ring gear/sun gear tooth ratios shown. The R1/S1 value is the tooth ratio of the planetary gear set 420; the R2/S2 value is the tooth ratio of the planetary gear set 430; and the R3/S3 value is the tooth ratio of the planetary gear set 440. As can also be determined from the truth table of FIG. 5b, the single step forward interchanges are single transition shifts.

FIG. 5b also provides a chart of the ratio steps between adjacent forward ratios and between the reverse and first forward ratio. For example, the ratio step between the first and second forward ratios is 1.56.

Figures 6A, 6B:
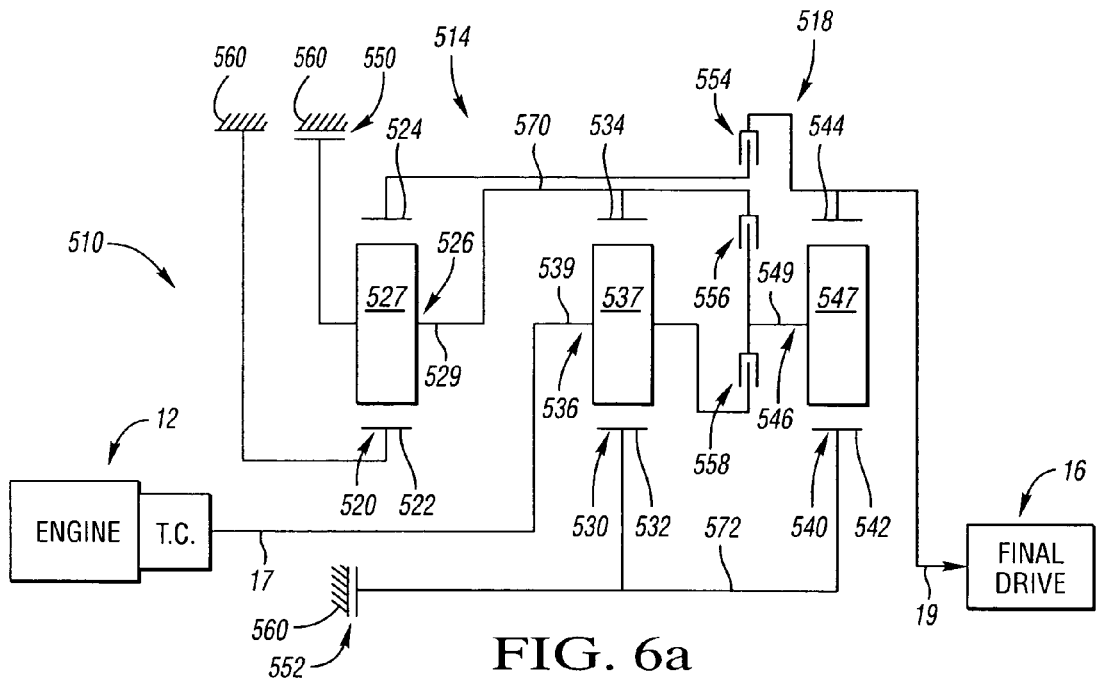

A powertrain 510, shown in FIG. 6a, includes an engine and torque converter 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes five torque-transmitting mechanisms 550, 552, 554, 556 and 558. The torque-transmitting mechanisms 550, 552 are stationary-type torque transmitting mechanisms, commonly termed brakes or reaction clutches. The torque-transmitting mechanisms 554, 556 and 558 are rotating type torque-transmitting mechanisms, commonly termed clutches.

The input shaft 17 is continuously connected with the planet carrier assembly member 536, and the output shaft 19 is continuously connected with the ring gear member 544. The planet carrier assembly member 526 is continuously connected with the ring gear member 534 through the interconnecting member 570. The sun gear member 532 is continuously connected with the sun gear member 542 through the interconnecting member 572. The sun gear member 522 is continuously connected with the transmission housing 560.

The planet carrier assembly member 526 is selectively connectable with the transmission housing 560 through the brake 550. The sun gear member 532 is selectively connectable with the transmission housing 560 through the brake 552. The ring gear member 524 is selectively connectable with the ring gear member 544 through the clutch 554. The ring gear member 534 is selectively connectable with the planet carrier assembly member 546 through the clutch 556. The planet carrier assembly member 536 is selectively connectable with the planet carrier assembly member 546 through the clutch 558.

The truth table shown in FIG. 6b describes the engagement sequence and combination of the torque-transmitting mechanisms to provide the reverse speed ratio and six forward speed ratios. It should be noted that the torque-transmitting mechanism 550 can remain engaged through the neutral condition, thereby simplifying the forward/reverse interchange. The chart of FIG. 6b describes the ratio steps between adjacent forward speed ratios and the ratio step between the reverse and first forward speed ratio.

The sample speed ratios given in the truth table are determined utilizing the tooth ratio values also given in FIG. 6b. The R1/S1 value is the tooth ratio of the planetary gear set 520; the R2/S2 value is the tooth ratio of the planetary gear set 530; and the R3/S3 value is the tooth ratio of the planetary gear set 540.

Figures 7A, 7B:
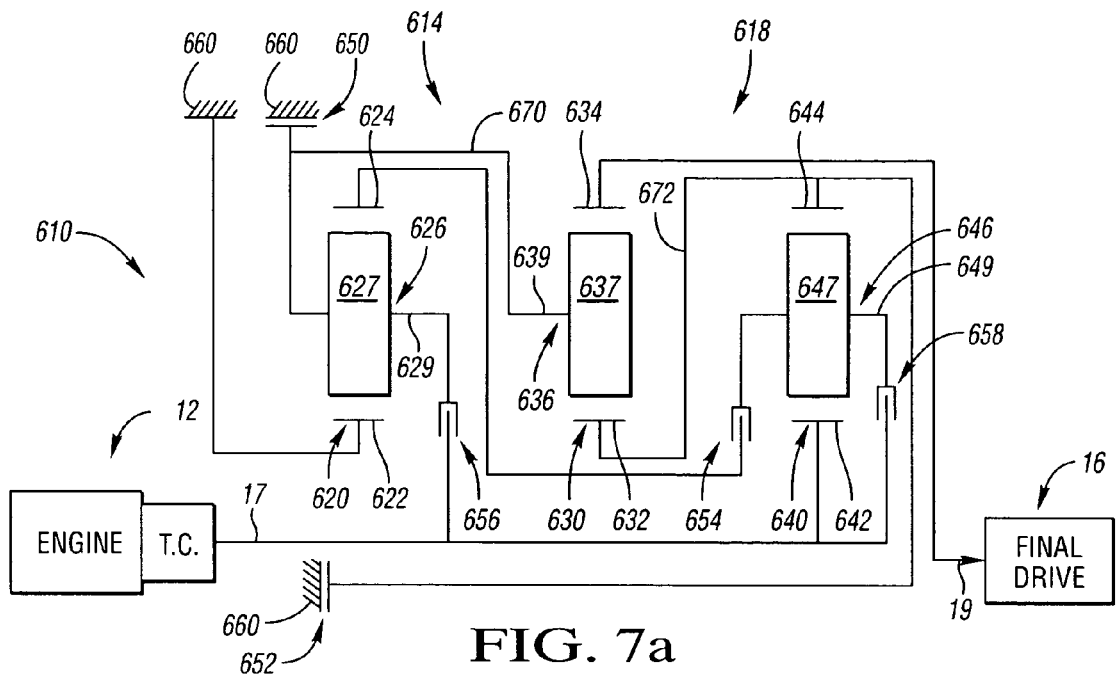

A powertrain 610, shown in FIG. 7a, has the engine and torque converter 12, a planetary transmission 614 and the final drive mechanism 16. The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly 626. The planet carrier assembly 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes five torque-transmitting mechanisms 650, 652, 654, 656 and 658. The torque-transmitting mechanisms 650, 652 are stationary-type torque transmitting mechanisms, commonly termed brakes or reaction clutches. The torque-transmitting mechanisms 654, 656 and 658 are rotating type torque-transmitting mechanisms, commonly termed clutches.

The input shaft 17 is continuously connected with the sun gear member 642, and the output shaft 19 is continuously connected with the ring gear member 634. The planet carrier assembly member 626 is continuously connected with the planet carrier assembly member 636 through the interconnecting member 670. The sun gear member 632 is continuously connected with the ring gear member 644 through the interconnecting member 672. The sun gear member 622 is continuously connected with the transmission housing 660.

The planet carrier assembly member 626 is selectively connectable with the transmission housing 660 through the brake 650. The ring gear member 644 is selectively connectable with the transmission 660 through the brake 652. The ring gear member 624 is selectively connectable with the planet carrier assembly member 646 through the clutch 654. The planet carrier assembly member 626 is selectively connectable with the sun gear member 642 through the clutch 656. The planet carrier assembly member 646 is selectively connectable with the sun gear member 642 through the clutch 658.

The truth table shown in FIG. 7b describes the combination of torque-transmitting mechanism engagements that will provide the reverse drive ratio and six forward speed ratios, as well as the sequence of these engagements and interchanges. The torque-transmitting mechanism 650 can be engaged through the neutral condition, thereby simplifying the forward/reverse interchange.

The ratio values given are by way of example and are established utilizing the ring gear/sun gear tooth ratios given in FIG. 7b. For example, the R1/S1 value is the tooth ratio of the planetary gear set 620; the R2/S2 value is the tooth ratio of the planetary gear set 630; and the R3/S3 value is the tooth ratio of the planetary gear set 640. The ratio steps between adjacent forward ratios and the reverse to first ratio are also given in FIG. 7b.

Figures 8A, 8B:
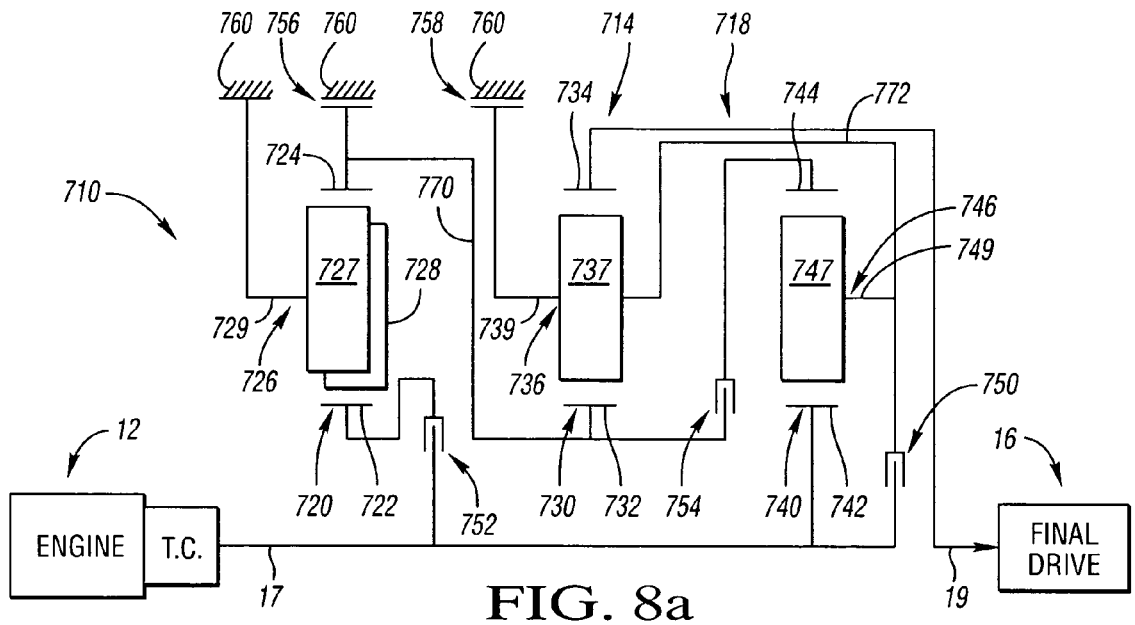

A powertrain 710, shown in FIG. 8a, has the conventional engine and torque converter 12, a planetary transmission 714, and the conventional final drive mechanism 16. The engine and torque converter 12 are drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722, a ring gear member 724, and a planet carrier assembly 726. The planet carrier assembly 726 includes a plurality of pinion gears 727 and 728 rotatably mounted on a carrier member 729. The pinion gears 728 are disposed in meshing relationship with the sun gear member 722, and the pinion gears 727 are disposed in meshing relationship with the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear arrangement 718 also includes five torque-transmitting mechanisms 750, 752, 754, 756 and 758. The torque-transmitting mechanisms 750, 752 and 754 are rotating type torque-transmitting mechanisms, commonly termed clutches. The torque-transmitting mechanisms 756 and 758 are stationary-type torque transmitting mechanisms, commonly termed brakes or reaction clutches.

The input shaft 17 is continuously connected with the sun gear member 742, and the output shaft 19 is continuously connected with the ring gear member 734. The ring gear member 724 is continuously connected with the sun gear member 732 through the interconnecting member 770. The planet carrier assembly member 736 is continuously connected with the planet carrier assembly member 746 through the interconnecting member 772. The planet carrier assembly member 726 is continuously connected with the transmission housing 760.

The planet carrier assembly member 746 is selectively connectable with the sun gear member 742 through the clutch 750. The sun gear member 722 is selectively connectable with the sun gear member 742 through the clutch 752. The sun gear member 732 is selectively connectable with the ring gear member 744 through the clutch 754. The ring gear member 724 is selectively connectable with the transmission housing 760 through the brake 756. The planet carrier assembly member 736 is selectively connectable with the transmission housing 760 through the brake 758.

The truth table of FIG. 8b defines the torque-transmitting mechanism engagement sequence utilized for each of the forward speed ratios and the reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; and the R3/S3 value is the tooth ratio of the planetary gear set 740.

FIG. 8b also provides a chart of the ratio steps between adjacent forward ratios and between the reverse and first forward ratio. For example, the ratio step between the first and second forward ratios is 1.94.

Figures 9A, 9B:
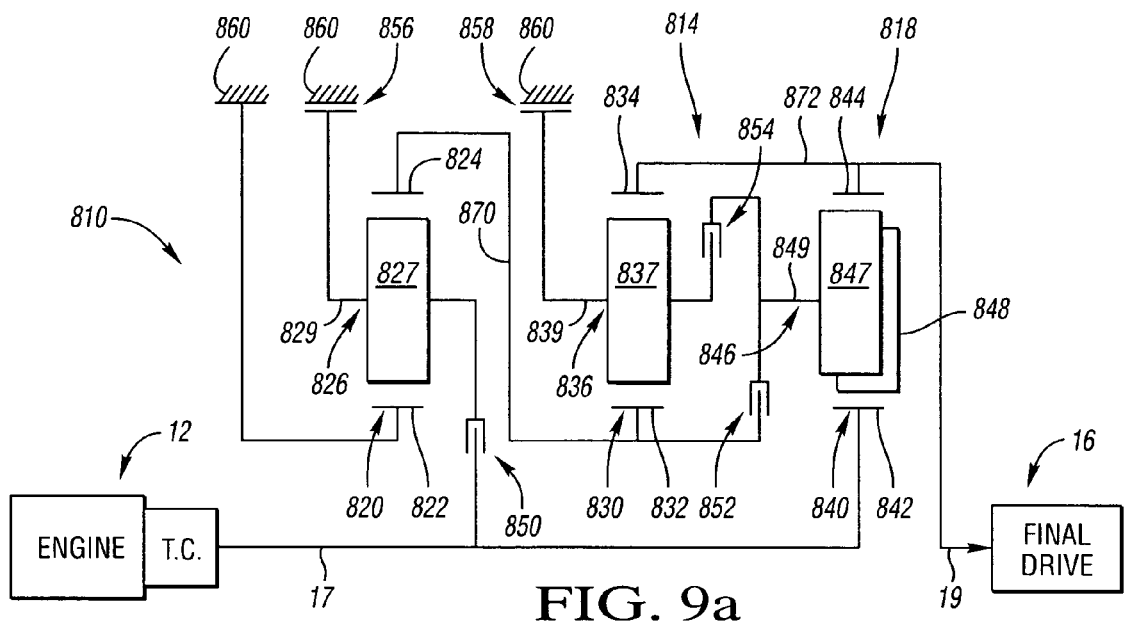

A powertrain 810, shown in FIG. 9a, has the conventional engine and torque converter 12, a planetary transmission 814, and the final drive mechanism 16. The engine and torque converter 12 are drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly 826. The planet carrier assembly 826 includes a plurality of pinion gears 827 rotatably mounted on a carrier member 829 and disposed in meshing relationship with both the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847, 848 rotatably mounted on a carrier member 849. The pinion gears 847 are disposed in meshing relationship with the ring gear member 844, and the pinion gears 848 are disposed in meshing relationship with the sun gear member 842.

The planetary gear arrangement 818 also includes five torque-transmitting mechanisms 850, 852, 854, 856 and 858. The torque-transmitting mechanisms 850, 852 and 854 are rotating type torque-transmitting mechanisms, commonly termed clutches. The torque-transmitting mechanisms 856 and 858 are stationary-type torque transmitting mechanisms, commonly termed brakes or reaction clutches.

The input shaft 17 is continuously connected with the sun gear member 842, and the output shaft 19 is continuously connected with the ring gear member 834. The ring gear member 824 is continuously connected with the sun gear member 832 through the interconnecting member 870. The ring gear member 834 is continuously connected with the ring gear member 844 through the interconnecting member 872. The sun gear member 822 is continuously connected with the transmission housing 860.

The planet carrier assembly member 826 is selectively connectable with the sun gear member 842 through the clutch 850. The sun gear member 832 is selectively connectable with the planet carrier assembly member 846 through the clutch 852. The planet carrier assembly member 836 is selectively connectable with the planet carrier assembly member 846 through the clutch 854. The planet carrier assembly member 826 is selectively connectable with the transmission housing 860 through the brake 856. The planet carrier assembly member 836 is selectively connectable with the transmission housing through the brake 858.

The truth table shown in FIG. 9b defines the torque-transmitting mechanism engagement sequence that provides the reverse speed ratio and six forward speed ratios shown in the truth table and available with the planetary gear arrangement 818. A sample of numerical values for the individual ratios is also given in the truth table of FIG. 9b. These numerical values have been calculated using the ring gear/sun gear tooth ratios also given by way of example in FIG. 9b. The R1/S1 value is the tooth ratio of the planetary gear set 820; the R2/S2 value is the tooth ratio of the planetary gear set 830; and the R3/S3 value is the tooth ratio of the planetary gear set 840. It can be readily recognized from the truth table that all of the single step forward interchanges are single transition ratio interchanges. FIG. 9b also describes the ratio steps between adjacent forward ratios and between the reverse and first forward ratio.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:
   an input shaft;
   an output shaft;
   first, second and third planetary gear sets each having first, second and third members;
   said input shaft being continuously interconnected with a member of said second or third planetary gear set, and said output shaft being continuously interconnected with another member of said second or third planetary gear set;
   a first interconnecting member continuously interconnecting said first member of said first planetary gear set with said first member of said second planetary gear set;
   a second interconnecting member continuously interconnecting said second member of said second planetary gear set with said first member of said third planetary gear set;
   wherein said second member of said first planetary gear set is continuously connected with a stationary member;
   a first torque-transmitting mechanism selectively interconnecting a member of said first planetary gear set with said stationary member;
   a second torque-transmitting mechanism selectively interconnecting a member of said second or third planetary gear set with said stationary member;
   a third torque-transmitting mechanism selectively interconnecting a member of said first planetary gear set with a member of said second or third planetary gear set;
   a fourth torque-transmitting mechanism selectively interconnecting a member of said third planetary gear set with a member of said first or second planetary gear set, said pair of members interconnected by said fourth torque-transmitting mechanism being different from the pair of members interconnected by said third torque-transmitting mechanism;
   a fifth torque-transmitting mechanism selectively interconnecting a member of said first, second or third planetary gear set with another member of said first, second or third planetary gear set, said pair of members interconnected by said fifth torque-transmitting mechanism being different from the pair of members interconnected by said third or fourth torque-transmitting mechanism; and
   said torque-transmitting mechanisms being engaged in combinations of two to establish at least six forward speed ratios and one reverse speed ratio between said input shaft and said output shaft.

2. The transmission defined in claim 1, wherein said first end second torque-transmitting mechanisms comprise brakes, and said third, fourth, and fifth torque-transmitting mechanisms comprise clutches.

3. The transmission defined in claim 1, wherein planet carrier assembly members of each of said planetary gear sets are single-pinion carriers.

4. The transmission defined in claim 1, wherein at least one planet carrier assembly member of said planetary gear sets is a double-pinion carrier.

5. A multi-speed transmission comprising:
   an input shaft;
   an output shaft;
   first, second and third planetary gear sets each having first, second and third members;
   said input shaft being continuously interconnected with a member of said second or third planetary gear set, and said output shaft being continuously interconnected with another member of said second or third planetary gear set;
   a first interconnecting member continuously interconnecting said first member of said first planetary gear set wit said first member of said second planetary gear set;
   a second interconnecting member continuously interconnecting said second member of said second planetary gear set with said first member of said third planetary gear set;

wherein said second member of said first planetary gear set is continuously connected with a stationary member;

a first torque-transmitting mechanism selectively interconnecting a member of said first planetary gear set with said stationary member;

a second torque-transmitting mechanism selectively interconnecting a member of said second or third planetary gear set with said stationary member;

a third torque-transmitting mechanism selectively interconnecting a member of said first planetary gear set with a member of said second or third planetary gear set;

a fourth torque-transmitting mechanism selectively interconnecting a member of said third planetary gear set with a member of said first or second planetary gear set, said pair of members interconnected by said fourth torque-transmitting mechanism being, different from the pair of members interconnected by said third torque-transmitting mechanism;

a fifth torque-transmitting mechanism selectively interconnecting a member of said first second or third planetary gear set with another member of said first, second or third planetary gear set, said pair of members interconnected by said fifth torque-transmitting mechanism being different from the pair of members interconnected by said third or fourth torque-transmitting mechanism; and wherein said first and second torque-transmitting mechanisms comprise brakes, and said third, fourth, and fifth torque-transmitting mechanisms comprise clutches, and planet carrier assembly members of each of said planetary gear sets are single-pinion carriers;

said torque-transmitting mechanisms being engaged in combinations of two to establish at least six forward speed ratios and one reverse speed ratio between said input shaft and said output shaft.

* * * * *